Patented Dec. 7, 1948

2,455,719

UNITED STATES PATENT OFFICE 2,455,719

GLASS MANUFACTURE

Woldemar A. Weyl and Helen S. Williams, State College, Pa., dedicated, by mesne assignments, to the People of the United States of America No Drawing. Application June 1, 1945, Serial No. 597,144

6 Claims. (Cl. 41—42)

This invention relates to improvements in glass manufacture and more particularly to the dealkalizing of the surface of the finished glassware and includes the glassware articles and products and the methods of producing them.

Alkali in the form of soda ash or sulfate forms an important constituent of most glass batches because it has the unique power of breaking down the refractory sand and bringing it into solution. After having accomplished this task the presence of alkali in the glass is less desirable. The alkali content is responsible for the high thermal expansion of soda-lime glasses which causes the glassware to break when subjected to thermal shock. In contact with moisture alkali from the surface of the glassware may go into solution and this may lead to undesirable modification or destruction of the glass surface, particularly where the surface area is very large as in glass fibers. Insulators made of soda-lime glass are inferior to those made of silica glass due to the presence of alkali which is responsible for both the surface and volume conductivity.

While the commercial soda-lime glasses are satisfactory for many purposes, the high requirements of the glass trade, especially the manufacture of bottles and special containers, requires limiting the amount of alkali used and increases the melting and firing temperature of the glass, with increased cost of manufacture as compared with glass of higher alkali content with a lower melting temperature.

It is known that glasses whose surfaces have been depleted of alkali assume superior properties such as increased chemical resistivity, decreased electric surface conductivity and improved strength. This improvement has been accomplished by treating the finished glassware with gases containing acidic constituents such as sulfur dioxide; but this treatment with acid vapors tends to remove not only the sodium but also the calcium from the surface of the glass and to give a more or less sharp line of demarcation between the surface layer which has been dealkalized and the underlying layer.

The present invention provides an improved process for dealkalizing glassware surfaces and particularly surfaces of soda-lime glassware, such as crown glass, etc., whereby alkali is removed from the surface of the glassware without accompanying removal of lime, and whereby surface-dealkalized glassware of improved properties can be produced.

According to the present invention dealkalization of glassware surfaces is accomplished by coating the surface of the glass with solid compounds such as metakaolin (dehydrated kaolin; see Searle, The Chemistry and Physics of Clays, second edition, page 455) or similarly reacting substances which can combine with alkali at high temperatures and by heating the glassware coated with such solid compounds to an elevated temperature sufficient to cause alkali to migrate from the glass surface and combine with such solid material. As a result of this treatment the surface is depleted of alkali and assumes properties characteristic of glassware with low alkali content.

We have found that coating the glass surface with clay (fired or unfired), iron oxide, ochre, chromium oxide and other similar substances, and firing at temperatures below the softening point of the glass, results in withdrawing alkali from the glass surface. Kaolin is particularly advantageous for use in the process but other substances which can form alkali compounds and which can combine with alkali at high temperatures have the same or a similar effect.

The glassware to which the invention is applicable includes crown glass and the common soda-lime glasses containing alkali in substantial amount. Thus, soda-lime glass with poor chemical resistivity can be readily improved by the treatment and given increased chemical resistivity. This is especially true for those glasses where the poor chemical resistivity is the result of overloading the glass with alkali.

It is one of the advantages of the present invention that it enables high alkali glasses to be produced at relatively low melting temperatures and to be treated to form glassware articles with dealkalized surfaces having improved properties comparable to or superior to those of articles initially made with lower alkali content and higher melting temperatures.

In carrying out the process of dealkalizing the glass surface a slip of the reagent, e. g., kaolin, is prepared by dispersing it in water, and the slip is applied to the glass surface to be treated, or, where a part only of the surface is to be treated, to the part of the glass surface which is to be treated, in the form of a continuous coating layer of, e. g., 0.5 mm. in thickness. After drying, the glassware is heated carefully at a temperature below the softening point of the glass for a time which may vary from a relatively short time to several hours. During this firing, alkali ions migrate to the surface and combine with the solid reagent. Alkali migration takes place even below the softening range, the alkali migrating to the outer surface layer and there combining with the solid material. The alkali is removed but not the lime and there is a more or less gradual dealkalization without any sharp line between the dealkalized surface layer and the glass beneath it and this gradual change in composition prevents or minimizes anti-glare or diffraction properties.

The new dealkalizing process can be carried out over a considerable temperature range but the character of the product produced will be different at different temperatures. With temperatures as low as 150–200° some dealkalization has been obtained. At these temperatures and at temperatures up to around 400° C. the adherent water film or hydrogen ions in the clay will react with the glass leading to a substitution of hydrogen ions for the sodium ions and giving a glass with increased surface reactivity. In cases where increased surface reactivity is desired a temperature around 250-350° C. is recommended and particularly a temperature around 300° C.

The hydrogen glass surfaces obtained by dealkalization at such low temperatures is different in structure from surfaces obtained by acid leaching where the acid attack will often remove all of the basic constituents and leave a hydrated silica skeleton. The present method substitutes hydrogen ions for the alkali ions and calcium or other divalent ions are not affected. The surface produced by acid leaching at low temperatures between room temperature and the boiling point of water gives a sharp demarcation line between the unaltered glass and the glass surface while the present method with its migration of sodium ions from the glass surface to the solid material does not give such a sharp line of demarcation between the surface layer and the underlying glass.

The new hydrogen glass produced by the present process with its increased surface reactivity can be used where the increased surface reactivity is desirable for combining with e. g. metal vapors to give a metallized surface or for combining with plastics or other materials. Thus, in making laminated safety glass, plastic mats reinforced by glass fibers, and water repellent coatings obtained by treating glass with organic silicones, it is important that good contact and adherence are obtained between the glass and the organic material; and the new hydrogen glass is advantageously used for such purposes. Hydrogen glasses treated with methylchlorosilane, or similar compounds, produce a strong bond between the silica network proper and the organic groups, and such a bond may be used to produce water repellent films. The same surface reaction may also be used to improve the adherence between glass and plastics in fiber glass mats and laminated safety glass.

When the new dealkalizing process is carried out at higher temperatures, an entirely different character of product is produced. Instead of being a hydrogen glass surface with increased surface reactivity the surface is one of increased chemical resistivity, improved strength and other desirable properties. To improve the chemical resistivity of the glass surface it is essential that the firing process be carried out at a temperature above 400° C. The temperature will vary somewhat with different glass compositions. At temperatures above about 400° C. water is liberated from such a glass surface and the chemical reaction as a whole can be described as a withdrawal of sodium oxide with subsequent rearrangement of the glass constituents that leads to the formation of a dense, non-porous surface layer having a higher silica and lower alkali content than the bulk of the glass and consequently having decreased chemical reactivity. A greatly increased chemical resistivity is obtained by carrying out the process at temperatures above 450° C. and particularly at temperatures between about 450° C. and about 550° C.

When the process is carried out at temperatures above 550° C. such as a temperature of around 600° C., which temperatures are above the strain point, the subsequent cooling of the glass article from temperatures above the strain point tends to cause deformation of the surface and the production of a wavy surface because the surface contracts less than the bulk of the glass. At temperatures below the strain point difference in contraction leads to the surface layer being in a state of compression; while above the strain point a part of the stress is released and causes deformation of the surface. Our investigations with soda lime glasses indicate that 550° was about the safe limit for obtaining a compressed and undeformed glass surface. Articles dealkalized at 600° C. showed a wavy surface.

Accordingly, for producing the new dealkalized surface glassware of improved chemical resistivity and strength the process is carried out below the strain point; although where the surface condition of the glassware is of secondary importance higher temperatures above the strain point can be used.

Accordingly, the temperature used in the process will enable a hydrogen glass of increased surface reactivity to be produced at the lower temperatures; while a glass of increased chemical resistivity and strength is produced at higher temperatures; and at still higher temperatures, above the strain point, deformed surfaces can be produced.

The carrying out of the process at intermediate temperatures, such as at temperatures above 400° and up to around 550° C., gives improved products of materially increased chemical resistivity. While for most purposes commercial soda-lime glasses have sufficient chemical resistivity, they can be improved in such resistivity and given other desirable properties by treatment according to the present process. But in such commercial soda-lime glasses the alkali content is limited and higher melting temperatures required. As a rule the good chemical qualities of this group of glasses is the result of lower alkali and additional alumina, which causes increase in the melting and firing temperature of the glass and makes the process more expensive. Such glassware, which may be satisfactory for many purposes, can be given improved properties by subjecting it to the present surface dealkalization process and thereby made satisfactory for purposes where more rigid tests for chemical resistivity are required.

Glass which is too high in alkali to meet the high requirements of the glass trade can be made at lower melting and firing temperatures and with less expense and then subjected to the present surface dealkalization process and thereby given properties which enable the glassware articles to meet more rigid tests for chemical resistivity and other desirable properties, including improved electrical resistance properties.

The progress of the dealkalization process and the nature and extent of the improved properties can be determined by various tests and measurements. We have found it convenient to test the reactivity of the glass surface by exposing it to the vapors of cuprous chloride and reducing the cuprous-ion-containing glass surface to develop a red color. From the intensity of the light absorption conclusions can be drawn as to the amount of cuprous ion which has entered the glass surface and in turn as to the chemical reactivity of the glass. Various other testing methods can be used for determining the reactivity and alkalinity of the glass surface, such as the chromate reaction, the nickel dimethylglyoxime test, the acid resistivity test, the thallous chloride test, the silver test, as well as tests of the mechanical properties of the glass.

The invention will be further described in connection with the following examples which illustrate the invention but it will be understood that the invention is not limited thereto.

*Example 1.*—Clay purified by electrodialysis was mixed with sufficient water to form a paste. This paste was applied to a portion of a normal soda-lime glass surface, using commercial microscope slides, so that comparison could be made of the treated surface with the untreated surface, and the paste was dried. The article was then heated for eight hours at 250° C. After the article had cooled the clay was removed by washing. At this low temperature hydrogen ions from the clay or from the water film adhering to the glass surface exchanged with the alkali ions of the glass on the surface covered by the paste, thus forming a hydrogen glass of increased surface reactivity. The hydrogen ions which have replaced the alkali in the glass surface enter base exchange reactions more readily than alkali ions in the same environment, as can be seen from the following test, in which the surface was treated with cuprous chloride. The glass article was placed in a covered container with a small amount of solid cuprous chloride and heated for eight hours at 450–500° C. The solid cuprous chloride volatilized, producing an atmosphere of cuprous chloride vapor. The cuprous ions replaced the hydrogen ions in the clay-treated portion of the glass surface. The glass article was then subjected to reduction in hydrogen at 400° for half an hour. During this treatment the glass assumed a red color. The red color which developed on the portion of the glass which had been in contact with the clay was much more intense than the color formed at the untreated portions of the surface, thus showing that the clay treatment at the low temperatures of this example produces a glass surface which is more reactive than the untreated surface.

*Example 2.*—A glass article of soda-lime glass was coated with a slip or paste of clay, the layer dried and the article fired at 500–550° C. for twenty-four hours.

The reaction at this high temperature is one of withdrawal of alkali ions with an equivalent amount of anions ordinarily oxygen. The remaining ions rearrange in the surface of the article forming a highly siliceous surface layer with very little alkali. Such a glass upon reaction with cuprous chloride vapor and reduction in hydrogen does not give a red color formation but only a faint pink color while at the same time the untreated portions of the same glass article developed a normal red color. At such high temperatures the clay treatment produces a glass article with a surface which is less reactive than an untreated article or the untreated portion of the same article.

The cuprous chloride vapor method is a convenient method for distinguishing between the clay treated and untreated parts of the same glass article or between a treated and an untreated article although it does not represent a customary method of determining chemical resistivity. Staining methods are commonly used for this purpose for testing in a laboratory based on the fact that hydrochloric acid when in contact with a glass surface dissolves the alkali and alkaline earths but not the silica. As a result a silica skeleton is built up during the chemical reaction and the resulting hydrated silica has a lower refractive index than the bulk of the glass. When it is viewed at an angle against a light source a purple interference color can be seen as soon as the thickness of the hydrated silica layer reaches a certain value which is of the order of the wavelength of visible light. When this test was applied to the treated and untreated portions of the article of the above example it showed greatly increased resistivity of the treated portion.

*Example 3.*—Normal soda-lime glass was modified to materially increase its chemical resistivity by replacing its sodium content by an equivalent amount of potash. When the untreated article was subjected to the hydrochloric acid treatment described in the preceding example the glass showed the formation of a purple film after only about three hours when tested in untreated hydrochloric acid diluted with an equal volume of water at 90° C. After such an article had been subjected to the present dealkalization process in accordance with the preceding example for twenty-four hours at 500–550° C. no visible film formation was observed even after five days.

*Example 4.*—A crown glass (a soda-lime optical glass) was modified by replacing 2, 4 and 6 mol percent silica respectively with corresponding amounts of sodium oxide, thus giving glass articles of increased alkali content. Such replacement impairs the chemical resistivity considerably and the glasses showed film formation when subjected to the hot hydrochloric acid treatment above referred to after six, three and one hour respectively. After such articles had been subjected to the present process by heating at 500–550° C. for twenty-four hours the articles did not showm film formation after five days.

The following table shows the results of tests on crown glass of high acid resistivity, and of variations from the crown glass which led to glasses of decreased chemical resistivity. The various glasses, including those of Examples 3 and 4, were subjected to the metakaolin treatment at the temperatures and for the periods of time indicated, and samples of the untreated and treated glasses were subjected to the hydrochloric acid test, with the results indicated in the table.

| Change made in the Composition of the Crown | Time for Film Formation of Untreated Glass | Metakaolin Treatment | | Time for Film Formation of Treated Glass |
|---|---|---|---|---|
| | | Time, hrs. | Temp., ° C. | |
| Original Crown | 25 hours | 24 | 500 | negative after 5 days. |
| Na₂O replaced by K₂O | 3 hours | 24 | 500 | Do. |
| Do | do | ½ | 500 | Do. |
| Do | do | ½ | 400 | positive after 5 days. |
| 2 mol per cent SiO₂ replaced by Na₂O | 6 hours | 24 | 500 | negative after 5 days. |
| 4 mol per cent SiO₂ replaced by Na₂O | 3 hours | 24 | 500 | Do. |
| 6 mol per cent SiO₂ replaced by Na₂O | 1 hour | 24 | 500 | Do. |
| Do | do | ½ | 500 | Do. |
| Do | do | ½ | 400 | Do. |
| 20 mol per cent SiO₂ replaced by 10% NaBO₂ | 5 minutes | 8 | 500 | Do. |
| 10 mol per cent SiO₂ replaced by 5% B₂O₃ and 7.5% Na₂O replaced by K₂O | 35 minutes | 8 | 500 | Do. |
| 4 mol per cent SiO₂ replaced by 4% CaO | Filmed immediately | 8 | 500 | positive after 22½ hours. |

The results of the tests shown in this table show that all variations of the crown glass which led to poorer chemical resistivity could be easily improved by the metakaolin treatment of the present invention. This is especially true for those glass articles where the poor chemical resistivity is the result of overloading the glass with alkali. Glasses whose content of divalent ion such as calcium, barium or lead is too high do not respond to the treatment to the same extent. From this table it will be seen that after dealkalizing the surface according to the present invention at 500–550° C. the glass had become so resistant to acids that no film formation could be observed after five days by the severe test in which 6 N hydrochloric acid was used at 90° C. The formation of the purple interference color was used at the end point in the tests of the above table.

For comparison it might be mentioned that a good quality plate glass, a soda-lime glass, such as used in commercial microscope slides and for other purposes, will show film formation after one or two days.

From the above examples it is evident that even high alkali glasses of extremely poor chemical resistivity can be changed into excellent glasses of good chemical resistivity by the process of the present invention when carried out at the higher temperatures.

While in the above examples clay is used as the solid alkali absorbing material, and is particularly advantageous for use in the process, other solid alkali combining substances can be used such as those above mentioned.

This improved process of the present invention results in the production of new and improved glassware articles or products. When the process is carried out at lower temperatures, e.g., around 250–400°C., an improved hydrogen glass of increased surface reactivity is produced. When the higher temperatures are used in the process, above 400° C. and up to around 500° C., new and improved glassware articles or products are produced with surfaces of decreased chemical reactivity. Moreover, the dealkalizing action of the process results in the production of products without a sharp line of demarcation between the dealkalized surface and the underlying bulk of the glassware since the gradual and progressive migration of the alkali ions to the surface gives a gradual change in dealkalization from that of the undealkalized bulk of the article to the surface where the dealkalizing action has progressed to its highest extent.

In addition to the improved chemical resistance of the treated glassware articles when treated at the higher temperatures, the treated articles are given improved mechanical properties. The reduction in the alkali content at the surface of the article which takes place at higher temperatures, e. g., around 500° C., gives a surface layer from which a considerable proportion of the alkali has been removed and this forms a layer of glass with lower thermal expansion. On cooling this surface layer tends to contract less than the bulk of the glass, thereby giving a surface layer which is under compression and which imparts improved mechanical properties to the treated glassware. Thus, if a high alkali glass of chemical composition of approximately 72% $SiO_2$, 20% $Na_2O$ and 8% $CaO$ is used the linear coefficient of expansion calculated on the basis of Winkelmann and Schott's factors for the three oxides is $100.4 \times 10^{-7}$. Assuming that one-half or more of the sodium oxide is removed from the surface layer by the present process this surface layer will have a reduced linear expansion and when the glass article is cooled the surface layer will be compressed so that the resulting treated article will have its original composition for the bulk of the glass but with the dealkalized surface under compression.

The fusibility of the glass surface is closely connected with some of the electrical properties and articles produced by the present process have been found to have improved electrical properties. Electrical conductivity tests were carried out with some test tubes made from soft glass tubing 12 mm. in diameter and 1.2 mm. wall thickness, made of soda-lime glass. The tube was filled with a conducting melt of either metal or sodium nitrate and inserted into a bath of the same conductor. In order to obtain comparable results the tubes were filled to a height of one inch each. The electrical resistance in ohms was measured with an alternating current between 230 and 400° C. Below 230° C. the resistance was too high to give reproducible values by the method used and above 400° C. the reproducibility was impaired by the self-diffusion of alkali ions which changed the structure of the dealkalized glass layer. Within this temperature range, however, the reproducibility was satisfactory. The results obtained with untreated glass and with glass treated according to the present process at 500° C. are shown in the following table.

| Temperature, ° C. | Glass Untreated | Glass Treated with Metakaolin at 500° C. | |
| --- | --- | --- | --- |
| | | 16 hours | 26 hours |
| 230 | 99,000 | 180,000 | 230,000 |
| 250 | 50,000 | 61,000 | 73,000 |
| 300 | 9,000 | 11,000 | 15,300 |
| 350 | 2,000 | 2,700 | 3,900 |
| 400 | 830 | 940 | 1,270 |

Using these values, and assuming that the metakaolin treatment produced dealkalization of a surface layer of between 0.1 and 0.01 mm. in thickness, a calculation of the approximate resistivity of the dealkalized layer as compared with that of the bulk of the glass showed that the electrical conductivity of the dealkalized layer was about one hundred times that of the bulk of the glass.

The improved electrical properties of the products of the present invention enable improved insulators to be produced by dealkalizing the surfaces of insulators which without treatment would have undesirable insulating properties.

In the foregoing examples the production of the products with decreased surface reactivity is carried out directly at the higher temperatures, e. g., above 400° C. and below about 550° C.; while the carrying out of the process at lower temperatures, around 250–400° C. gives products of increased surface reactivity, particularly around 300° C. The products of increased surface activity produced at the lower temperatures can be converted into products of increased surface reactivity by subsequently heating them for a short time to the higher temperature, e. g., around 500° C., thereby removing water and converting the hydrogen glass into a layer of decreased chemical activity. Such heating to higher temperatures should not be carried to the point of softening the glass which would destroy the effects of the metakaolin treatment by causing new alkali ions to diffuse into the surface layer.

When the temperature is maintained around 500° C. the dealkalized layer formed, particularly if the dealkalization is substantially complete and an alkali-free layer is formed, resists the diffusion of alkali ions.

It will thus be seen that the present invention provides an improved process of dealkalizing the surfaces of glassware by heating the articles to an elevated temperature while coated with a solid alkali-absorbing material such as clay, etc., and that thereby improved products with dealkalized glass surfaces can be produced including products produced at lower temperatures with hydrogen glass surfaces of increased reactivity and articles produced at higher temperatures of decreased surface reactivity; and that the carrying out of the process at higher temperatures enables high alkali-content glassware to be treated to impart surface properties which make the articles comparable with low alkali glassware articles.

It will also be seen that the new glassware articles involve a gradual and progressive migration of alkali ions to the surface where they combine with the solid material with a gradient and alkali content from the dealkalized surface through an intermediate layer adjacent the surface to the main body of the article with its original alkali content.

It will also be seen that the present invention enables articles to be treated over portions of their surface areas while remaining untreated over other areas, thus giving articles having different properties on their treated and untreated portions where this is desirable.

It will further be seen that the improved low temperature product of increased surface activity can be converted into a product of decreased surface activity by subsequently heating it to a higher temperature; and that both the low temperature product and the higher temperature products are valuable products for various purposes where their improved properties are taken advantage of; the low temperature products of increased reactivity being valuable products for useful purposes where increased surface reactivity of the dealkalized surface is desirable; while the products produced at higher temperatures and having decreased surface activity are valuable products for many purposes, having improved properties as compared with the same glassware articles before treatment and enabling inferior glassware articles of high alkali content to be converted into superior products.

We claim:

1. New glassware articles with dealkalized surfaces made of soda-lime glasses, said surfaces being uncolored and unstained and free from added metal and containing their normal calcium content but with reduced alkali content as compared with the bulk of the glass and with a progressive increase in alkali content from the dealkalized surface to the undealkalized portion of the glassware, said dealkalized surface being under greater compression as compared with the bulk of the glass.

2. The method of dealkalizing glassware surfaces which comprises coating the surfaces with an aqueous dispersion of a clay, drying the coated glassware, and heating the coated glassware to above 150° C. and below the softening temperature of the glassware to effect removal of alkali from the surfaces and combination thereof with the clay.

3. The method of dealkalizing glassware surfaces which comprises coating the surfaces with an aqueous dispersion of a clay, drying and then heating the coated glassware to above 150° C. and below the softening temperature of the glass to effect removal of the alkali from the surfaces and combination thereof with the clay, and removing the alkali-enriched clay.

4. The method of dealkalizing glassware surfaces as set forth in claim 3 in which the temperature of heating is between 150° C. and about 400° C. whereby a hydrogen glass of increased surface reactivity is produced.

5. The method of dealkalizing glassware surfaces and of giving to such surfaces decreased chemical reactivity which comprises coating the surfaces with a clay, drying and then heating the coated glassware to a temperature of between 400° C. and 550° C. to remove alkali from the surfaces and combine it with the clay with the resulting production of glassware having surfaces of decreased chemical reactivity, and removing the alkali-enriched clay.

6. The method of dealkalizing glassware surfaces and of causing deformation of the surfaces which comprises coating the surfaces with clay, drying and then heating the coated glassware to a temperature between 550° C. and about 600° C. to remove the alkali from the surfaces and combine it with the clay with the resulting formation of a deformed and wavy surface.

WOLDEMAR A. WEYL.
HELEN S. WILLIAMS.

REFERENCES CITED

The following references are of record in the file of this patent:

UNITED STATES PATENTS

| Number | Name | Date |
| --- | --- | --- |
| 254,263 | Bitterlin | Feb. 28, 1882 |
| 1,306,505 | Veda | June 10, 1919 |
| 1,328,833 | Hasburg | Jan. 27, 1920 |
| 1,555,852 | Heidemann | Oct. 6, 1925 |
| 1,592,429 | Kraus | July 13, 1926 |
| 1,698,302 | Goss | Jan. 8, 1929 |
| 2,034,987 | Morita | Mar. 24, 1936 |
| 2,184,316 | Plummer | Dec. 26, 1939 |
| 2,215,039 | Hood | Sept. 17, 1940 |
| 2,330,193 | Blau | Sept. 28, 1943 |
| 2,348,704 | Adams | May 16, 1944 |